United States Patent [19]

Lillbacka

[11] 4,345,453

[45] Aug. 24, 1982

[54] HYDRAULIC PRESS

[76] Inventor: Jorma Lillbacka, SF-62300 Härmä, Finland

[21] Appl. No.: 82,389

[22] Filed: Oct. 5, 1979

[30] Foreign Application Priority Data

Apr. 17, 1979 [FI] Finland .................................. 791227

[51] Int. Cl.³ .............................................. B21J 9/12
[52] U.S. Cl. .................................. 72/453.18; 72/402; 72/441
[58] Field of Search .............. 72/402, 453.01, 453.18, 72/455, 441, 399, 453.02, 453.03; 100/269

[56] References Cited

U.S. PATENT DOCUMENTS

| | | | |
|---|---|---|---|
| 2,203,956 | 6/1940 | Gettig | 72/402 |
| 2,256,740 | 9/1941 | Gup | 72/402 |
| 3,415,105 | 12/1968 | Brown | 72/402 |
| 3,430,290 | 3/1969 | Kinslow | 72/402 |
| 3,451,249 | 6/1969 | Sharon | 72/402 |
| 3,534,679 | 10/1970 | Forichon | 100/269 |
| 3,645,126 | 2/1972 | Kralowetz | 72/453.18 |
| 3,916,667 | 11/1975 | Paknke | 72/402 |

FOREIGN PATENT DOCUMENTS

| | | |
|---|---|---|
| 305810 | 6/1968 | Sweden . |
| 542008 | 11/1973 | Switzerland . |
| 1054184 | 1/1967 | United Kingdom . |
| 1365032 | 8/1974 | United Kingdom . |

Primary Examiner—Gene Crosby
Attorney, Agent, or Firm—Pollock, Vande Sande & Priddy

[57] ABSTRACT

An improved radial or parallel press includes a hydraulic control valve and cylinder for each jaw or foot of the press and a corresponding plurality of valve control cams which move together to actuate the control valves in synchronism.

10 Claims, 7 Drawing Figures

HYDRAULIC PRESS

DESCRIPTION

1. Technical Field

The present invention relates to a type of hydraulic press having two or more working cylinders for applying force in parallel directions or in concentric radial directions, to press the workpiece either along parallel or concentric radial directions. The presses for applying radially directed forces are particularly useful for crimping hose-couplings onto the ends of hoses.

The type of press used to attach hose couplings comprises force transmitting members which move in the radial direction to crimp the hose-coupling onto the end of the hose, when the loosely assembled hose and coupling are placed at the center of action of the force transmitting members. The coupling diameter is reduced by the press so that the coupling fastens tightly onto the end of the hose. Similarly, an edging machine can have two or more working cylinders which move in parallel directions to transmit force to a common pressing beam to move it so that the beam can be pressed against a working base on which a workpiece such as a metal sheet or plate is placed to be worked or pressed into a desired shape.

2. Background Art

Previously known radial pressing machines for the most part have been driven mechanically using axial working cylinders to move tapered or ramp-like cam surfaces, which in turn cause the radially movable force transmitting members operatively connected to the cams to move toward the workpiece. This kind of structure has a number of disadvantages, however, which are very inconvenient in many respects. First of all, the stroke length of the force transmitting members and, therefore, the depth of deformation during pressing are rather small. This limitation makes it very difficult to press objects having significant radially extending portions such as flanges. In such cases, radial presses must have a rather large central opening and long press stroke to clear the flanges. Another disadvantage is that the tapered or ramp-like cam surfaces which transmit the axial movement of the working cylinders to the radial movement of the force transmitting members, must have proper lubrication. Should this lubrication fail, considerable damage may result because of the great contact pressure acting in these machines. Other difficulties may arise if, for example, the return spring is broken between the radial force transmitting elements so that it is possible that the resultant pressed portions of the workpiece may have skewed portions which could cause serious damage to the machine.

DISCLOSURE OF THE INVENTION

The mechanically working parts of the prior art press are replaced by working cylinders extending radially toward the worked part, which is placed at the center defined by the axes of the cylinders, each cylinder having an operatively connected working jaw for contacting and deforming or pressing the workpiece. Movement of the cylinder pistons is synchronized so that all working jaws move equal distances in equal times, so that the part being worked is pressed uniformly from every side to produce a uniform deformation around its whole periphery, a necessary characteristic as far as attaching hose-couplings is concerned. To synchronize the movement of the working jaws it would be possible to use electrohydraulic servo valves of known types. Such valves control the flow of hydraulic liquid into the cylinders in such a way that the desired effect is accomplished. This kind of structure would be rather expensive, however, because every cylinder would need its own servo valve. These valves can furthermore rather easily cause difficulties in the workshop environment in which these machines are used.

The present invention provides a simple solution to the problem of synchronizing movement of the cylinders in a pressing machine or the like. Simple mechanically activated valves which are reliable in operation are used to control the cylinders. According to one preferred embodiment of the invention, each working cylinder is provided with its own tapered or ramp-like cam surface arranged to move essentially transversely to the direction of force application by the working cylinder. The cam surface is arranged to control operation of a valve attached to each working cylinder, the spindle of the valve being provided with a follower resiliently biased into contact with the cam surface. In response to movement of the cam surface, the valve admits hydraulic fluid into the working cylinder in such way that the stroke of the cylinder piston follows the cam surface during its movement.

The present invention has many important advantages. Much longer stroke of the working jaws is achieved by presses embodying the invention, in comparison to previously known mechanically driven machines. This fact makes it possible to press workpieces having flanges or rather long radial dimensions. The part being pressed can be better seen during deformation. Because of the long length of the stroke, it is possible to use the same working jaws for a large number of different diameters. Friction is greatly reduced and the prior art difficulties with lubrication are eliminated. The construction of the machine is simple.

BRIEF DESCRIPTION OF DRAWINGS

The invention is explained in the following specification in which preferred embodiments and specific details of the invention are presented. Reference is made to the drawings, in which.

BEST MODE FOR CARRYING OUT THE INVENTION

Figure 1:
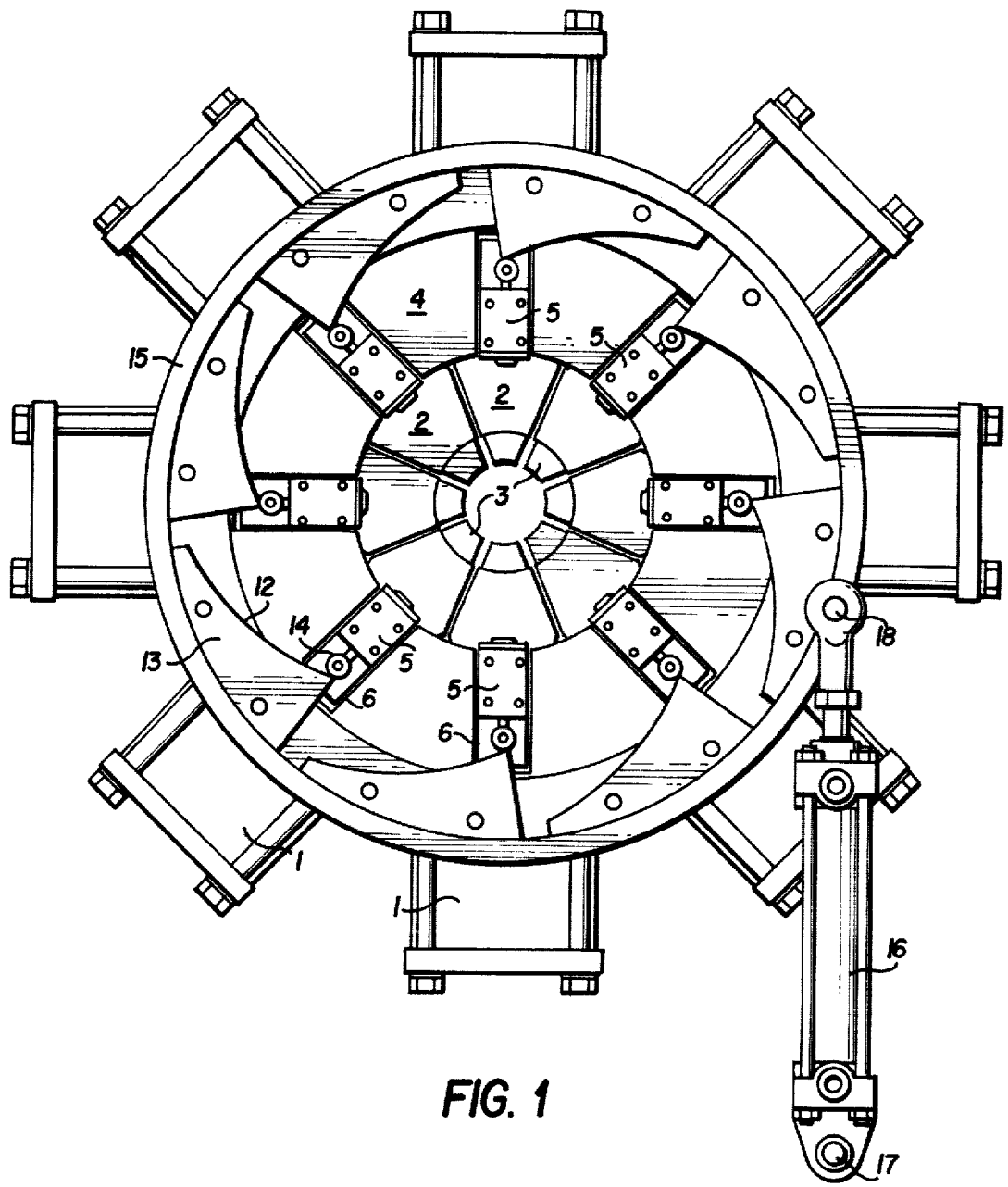
FIG. 1 shows schematically a front view of one embodiment of a radial pressing machine according to the invention.

FIG. 1 shows a schematic front view of a radial pressing machine according to one embodiment of the invention. Eight radially oriented working cylinders 1 are provided for radially moving wedge-shaped base jaws 2 which are attached to the piston rods of cylinders 1. The actual working jaws 3 are attached to base jaws 2, using suitable quick locking devices. Cylinders 1 are fixedly attached to an annular framework 4 by suitable means not illustrated. The individual piston rods of cylinders 1 extend through framework 4 toward the center of the machine through passages not illustrated in FIG. 1. Eight hydraulic valves 5 are provided for controlling the flow of hydraulic fluid to and from cylinders 1. Valves 5 are attached to their respective piston rods to move with them in the radial direction. In front of each cylinder 1 framework 4 is provided with a corresponding radial opening 6, through which valves 5 extend axially partially beyond the front side of framework 4.

Figure 2:
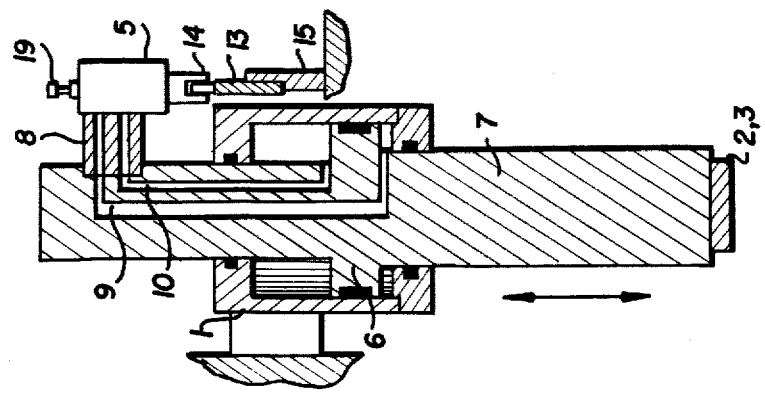
FIGS. 2-4 show longitudinal sections of different embodiments of the working cylinder, piston and valve according to the invention.

FIG. 2 schematically shows cylinder 1, its attachment to the circular framework 4, the cylinder piston 6 and the piston rod 7. Valve 5 is attached to piston rod 7 by means of a manifold block 8. The hydraulic liquid passes to and from cylinder 1 through the channels 9 and 10 provided in the piston rod, one to each side of piston 6. Circular framework 4 is attached to a supporting framework 11 of the machine, as illustrated only partly in FIG. 2. The actual framework of this kind can have the known construction and may include a work surface or table for use by the operator; an enclosure for elements such as the driving motor, the hydraulic pumps, the oil reservoirs, the electrical equipment and so forth; and a storage space for tools and equipment. To simplify this description, various electrical conductors and hydraulic conduits which are familiar to those skilled in the art have not been illustrated.

According to the invention, each cylinder 1 is located adjacent a circumferentially movable valve control cam 13, which has a tapered, or ramp-like cam surface 12 and which controls movement of piston 6. When cam 13 moves past valve 5, a resiliently biased cam follower 14, operatively associated with the spool of valve 5, follows cam surface 12 to move the valve spool to control valve 5 so that piston 6 moves toward or away from the center of the machine, depending on the direction of movement of control cam 13. The spool of the valve has a spring shown schematically in FIG. 6, which forces cam follower 14 into continuous contact with cam surface 12. According to the embodiment illustrated in FIGS. 1 and 2, the control cams 13 having cam surfaces 12 are attached to circular holder 15, the cams being equally spaced around holder 15. Holder 15 is supported on the framework by suitable bearings (not shown) so that it can easily be turned concentrically around the pressing center of the machine. To rotate holder 15, a cylinder 16 is provided with its one end joined to the framework at 17 and its head end joined to a pin 18 attached to holder 15. The length of stroke of cylinder 16 is chosen so that each control cam 13 may be moved circumferentially along the entire length of its cam surface 12.

Figure 2A:
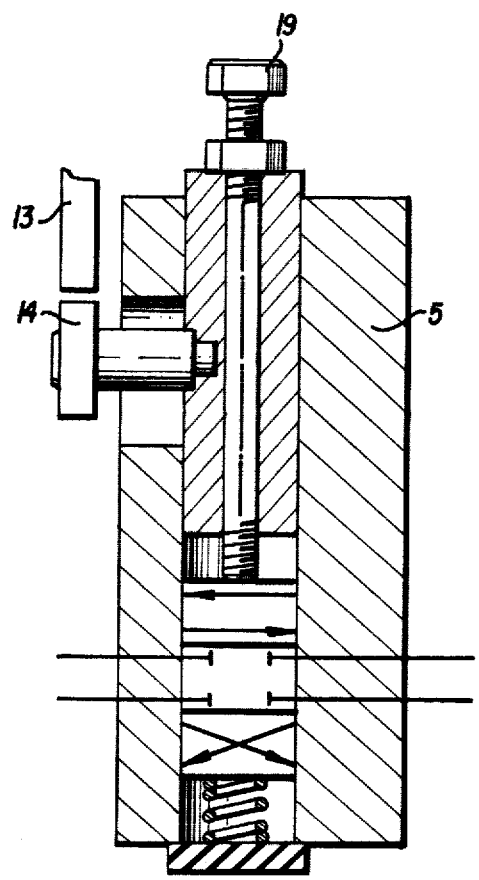
FIG. 2A shows a schematic sectional view through a control valve of the type used in the invention.

FIG. 2 shows a sectional view of circular holder 15 attached to framework 4. Control cam 13, attached to holder 15 also is shown. An adjusting screw 19 is provided on valve 5, by means of which the clearance between the spool of the valve and cam follower 14 can be adjusted to select the position of cam follower 14 at which cam 13 will have moved far enough to begin to move the valve spool. See FIG. 2A. Thus, it is possible to adjust the stroke of the pressing cylinder very accurately by timing the open period of valve 5 as cam 13 is rotated, whereby the length of the stroke of each individual cylinder can be accurately controlled to get the same pressing length for all cylinders.

In operation, rotation of holder 15 is achieved by actuation of cylinder 16. Since control cams 13 move with holder 15 and cam followers 14 follow cam surfaces 12, a corresponding control movement is undergone by the spools of the valves so that working cylinders 1 can extend or retract their piston rods. FIG. 1 shows the configuration of the machine where the pistons are at the end of a pressing stroke. When steering cylinder 16 is actuated, holder ring 15 turns counterclockwise causing the pistons of cylinders 1 to move away from the center. The workpiece is then removed and a new one is pushed into the center of the machine. Upon actuation of cylinder 16, holder ring 15 turns clockwise causing the pistons to move toward the center of the machine. Instead of the cylinder 16, other devices such as a motor and gears, crank drive or some other known driving mechanism may be used.

Figure 3:
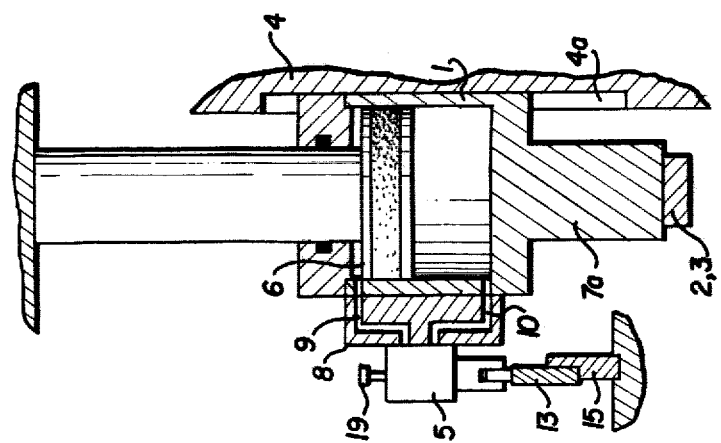
Figure 4:
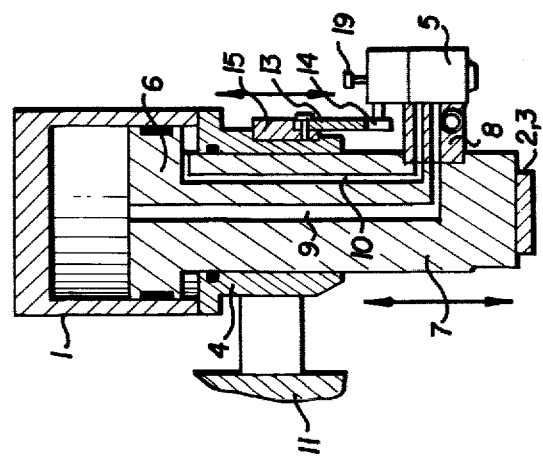

The pressing cylinders and their associated control valves and cylinders can be arranged in different ways. Thus, FIGS. 1 and 2 show fixed cylinders and movable pistons with the control valves attached to the piston rods so that channels 9 and 10 lead from the valve through the piston rod into the cylinder. This construction has the advantage that the control elements and their supports form a rather compact arrangement. In the embodiment shown in FIG. 3, piston 6 is fixed; whereas, cylinder 1 moves, with valve 5 attached to its side. Cylinder 1 can move along tracks 4a provided in framework 4, for example. Control cam 13 is attached to holder 15, which rotates on bearings provided between it and the framework. In the embodiment shown in FIG. 4, piston 6 is provided with rods 7 on both ends, the rods passing through the end walls of the cylinder. Valve 5 is attached to that piston rod 7 which is on the opposite side of piston 6 from the rod which supports base jaws 2 and working jaws 3. The control cam 13 is attached to the holder 15 which rotates relative to the framework. The construction of FIG. 4 provides a long free piston rod to which the jaws are attached, whereby the control cams, valves and so forth do not limit visibility in and access to the work area of the press.

Figure 5:
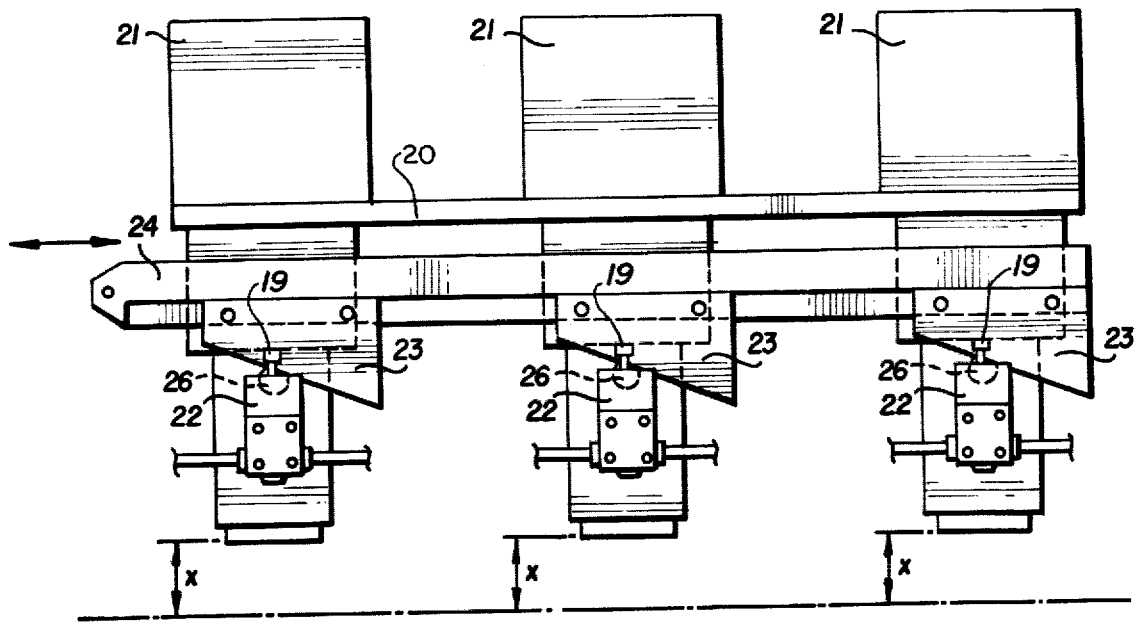
FIG. 5 shows a front view of another embodiment according to the invention.

FIG. 5 illustrates a further embodiment of the invention in which a frame 20 supports several cylinders 21 are arranged in parallel, to act in the same direction, possibly acting on the same pressing beam or tool. The control cams 23 for controlling the valves 22 of the cylinders are ramp-like and are attached to a straight beam 24, which can be moved by means of a control cylinder in the same manner as in the previous embodiments. Valves 22 include adjusting screws 19 and resiliently biased cam followers 26 (in phantom) which contact cams 23. By this means it is possible to have relatively long groups of cylinders in the same pressing machine. For example, in edging machines, bending of the pressing beam is not so severe as in previously known pressing machines. Moreover, the pressing beam and the framework of the machine need not be excessively rugged to avoid the bending, so that the construction cost of the machine is reduced. Holder beam 24 may be supported in such manner that the pressing forces do not act on it, so that the cylinders are more accurately controlled and the long pressing beam can be kept essentially straight. To simply this example, FIG. 5 shows only three cylinders; however, fewer or more may be used as required.

Figure 6:
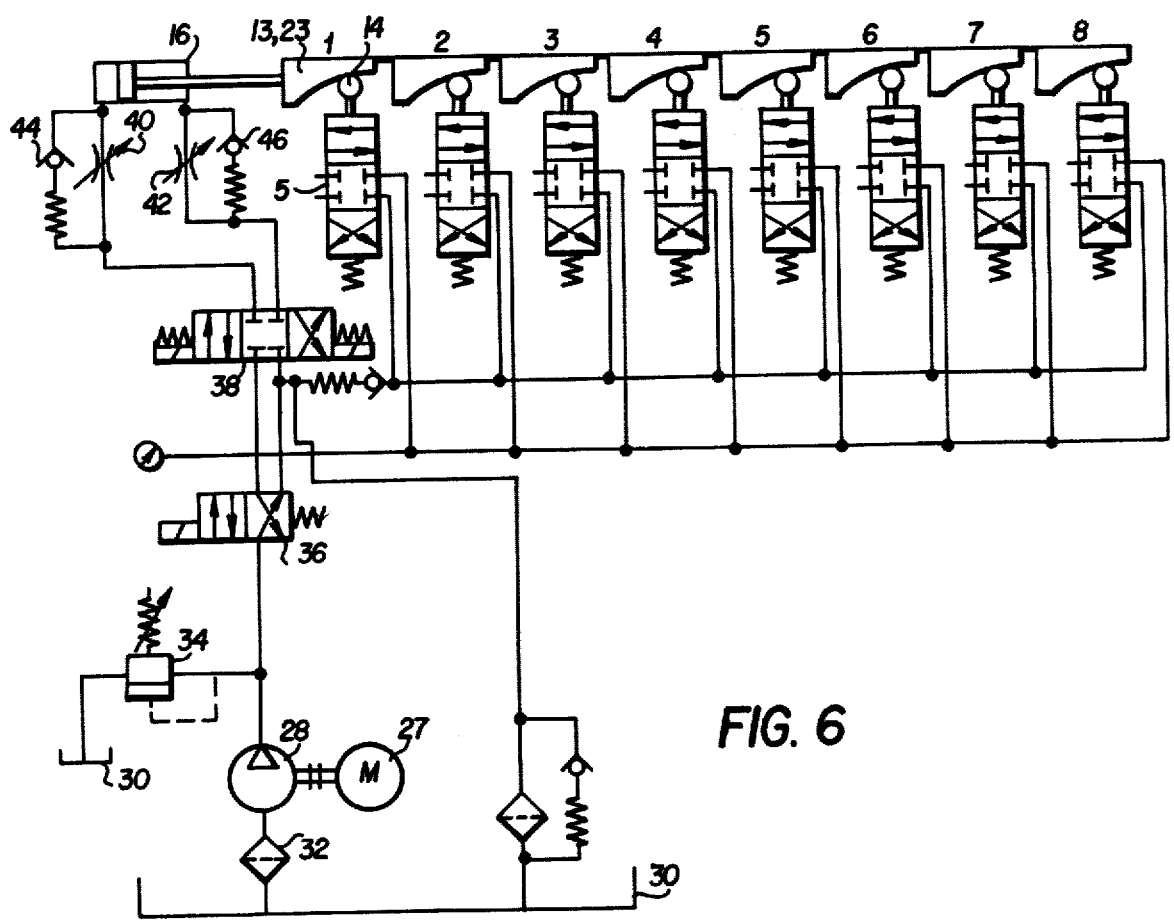
FIG. 6 shows the hydraulic fluid circuit of a press according to the invention.

FIG. 6 shows a schematic diagram of a hydraulic system suitable for use with the invention in both the radial and parallel configurations. Of course, other arrangements may be used with the invention, as will be understood by those skilled in the art. A motor 27 drives a hydraulic pump 28 which draws hydraulic fluid from a sump 30 via a filter 32. An adjustable pressure regulator 34 is provided to maintain pump outlet pressure within desired limits. A four-way, normally open, solenoid operated valve 36 directs fluid to control valves 5 in one position and to sump 30 in another. Valve 36 also controls flow to a four-way, normally closed, solenoid operated valve 38 which directs fluid to the one side of the piston of cylinder 16 via adjustable valve 40 or 42, and also directs fluid from the other side of the piston back to sump 30 via check valve 44 or 46. As cylinder 16 is actuated, control cams 13, 23 are moved to operate the press in the manner previously described.

Industrial Applicability

The radial and parallel embodiments of the press according to the present invention may be used in numerous industrial environments for attaching one annular piece to a support by radial crimping, for deep forming materials along substantial lengths, for radially shaping various workpieces and similar applications.

I claim:

1. An improved press, comprising:
   at least one hydraulic cylinder for moving at least one jaw of the press;
   a control valve for said at least one cylinder, said valve having a movable spool for controlling flow of hydraulic fluid to said at least one cylinder;
   at least one control cam having a cam surface, said cam being adapted for movement transverse to the axis of movement of the piston of said at least one cylinder;
   at least one cam follower connected between said movable spool and said cam surface, whereby movement of said cam adjusts the position of said control valve; and
   means for moving said control cam to actuate said control valve.

2. A press according to claim 1, wherein there are a plurality of said cylinders, each with its own control valve, jaw, cam and cam follower, said cylinders being arranged radially to move said jaws toward and away from a common center.

3. A press according to claim 1, wherein there are a plurality of said cylinders, each with its own control valve, said cylinders being arranged in parallel to act upon a common line.

4. A press according to claim 1, wherein said cam surface is tapered or ramp-like in configuration.

5. A press according to claim 2, further comprising a frame for the press, said cylinders being equally spaced on said frame, and means rotatably mounted to said frame for supporting said cams in position to be contacted by said followers.

6. A press according to claim 5, wherein said supporting means comprises an annular element mounted for rotation relative to said frame about said common center and connected to said moving means.

7. A press according to claim 3, further comprising a frame for the press, said cylinders being equally spaced on said frame, and means mounted for translation relative to said frame for supporting said control cams in position to be contacted by said followers.

8. A press according to claim 7, wherein said supporting means comprises an essentially straight beam, said cylinders being mounted essentially transversely to said beam, said control cams being attached to said beam at each cylinder and said beam being connected to said moving means.

9. A press according to claim 2, further comprising means for adjusting the clearance of said cam follower relative to said spool, whereby the timing of the open period of said valve may be adjusted.

10. A press according to claim 3, further comprising means for adjusting the clearance of said cam follower relative to said spool, whereby the timing of the open period of said valve may be adjusted.

* * * * *